United States Patent [19]
Van Maanen

[11] Patent Number: 5,749,439
[45] Date of Patent: May 12, 1998

[54] HYDRAULIC FLUID STORAGE FOR A POWERTRAIN

[75] Inventor: Keith D. Van Maanen, Bloomfield Hills, Mich.

[73] Assignee: General Motors Corporation, Detroit, Mich.

[21] Appl. No.: 821,836

[22] Filed: Mar. 21, 1997

[51] Int. Cl.$^6$ ........................... F01M 9/00
[52] U.S. Cl. ............... 184/6.12; 184/6.22; 184/104.1; 74/467
[58] Field of Search ................ 184/6.12, 6.22, 184/104.1; 74/467; 165/300; 137/389

[56] References Cited

U.S. PATENT DOCUMENTS

| | | |
|---|---|---|
| 2,383,878 | 8/1945 | Miller ............................ 184/622 |
| 2,965,120 | 12/1960 | Snyder .......................... 137/389 |
| 3,716,995 | 2/1973 | Peter et al. . |
| 3,752,222 | 8/1973 | Olbermann, Jr. . |
| 4,209,985 | 7/1980 | Master . |
| 4,217,926 | 8/1980 | Van Gorder . |
| 5,125,368 | 6/1992 | Tzavaras . |
| 5,165,468 | 11/1992 | Tajima et al. . |
| 5,244,036 | 9/1993 | Michl ............................ 165/300 |
| 5,456,129 | 10/1995 | Tane et al. ..................... 74/467 |

FOREIGN PATENT DOCUMENTS

| | | |
|---|---|---|
| 6-94106 A | 4/1994 | Japan . |
| 6-272751 A | 9/1994 | Japan . |

*Primary Examiner*—Thomas E. Denion
*Attorney, Agent, or Firm*—Donald F. Scherer

[57] ABSTRACT

A powertrain includes a multi-speed transmission having a primary storage reservoir which has sufficient volume to contain the transmission fluid when the temperature thereof is at or below a predetermined temperature. At higher temperatures, a portion of the hydraulic fluid is directed to a cooling device which also provides secondary storage. A valve mechanism is provided to control the hydraulic fluid flow such that below the predetermined temperature, hydraulic fluid is not directed to the cooling device which is drained by the valve mechanism to the primary storage. The valve mechanism is temperature-responsive whereby at temperatures above the predetermined temperature a portion of the hydraulic fluid must fill and pass through the cooling device before being directed to a lubrication circuit and returned to the primary storage, thereby increasing the storage volume available to the system.

3 Claims, 1 Drawing Sheet

HYDRAULIC FLUID STORAGE FOR A POWERTRAIN

TECHNICAL FIELD

This invention relates to hydraulic fluid storage for powertrains.

BACKGROUND OF THE INVENTION

Transmissions and powertrains operate over a wide range of temperatures from cold, for example, ambient, to hot, for example, 300 degrees Fahrenheit. Fluid is used as a control medium for establishing shift points between gears and a power source for clutch and brake engagement. This fluid varies in volume as the temperature varies.

Two of the important considerations for the storage of the hydraulic fluid are (1) inlet to the control pump is always submerged; and (2) the rotating components are not in the fluid during rotation. While the first consideration can be addressed with many reservoir designs, the second must be accommodated while maintaining as small a reservoir as possible so that the under pan or sump of the transmission has the desired vehicle ground clearance.

One solution to this problem is a two-reservoir system, such as that disclosed in U.S. Pat. No. 4,217,926, issued Aug. 19, 1980, to Van Gorder and assigned to the assignee of the present invention. However, this system has the secondary reservoir within the confines of the transmission envelope. This system, while effective in maintaining ground clearance, adds axial length to the transmission.

With the need for more efficient use of the space in the powertrain compartment for transverse drives, axial length of the transmission is important. With the longitudinal powertrains, the axial space required for positioning the secondary reservoir of the above-identified patent is not available using that design.

SUMMARY OF THE INVENTION

It is an object of this invention to provide an improved fluid storage system for a power transmission.

In one aspect of the invention, a valve member is disposed in fluid communication with a lubrication circuit, the system control valving, a remote cooling system and the transmission reservoir. When the hydraulic fluid is below a predetermined temperature, the valve prevents fluid flow to the cooling system which is drained through the valve to the transmission reservoir. Above this temperature, the valve directs normal lube flow to the cooling system while flow from the cooling system is directed to the lube circuit before return to the reservoir.

In another aspect of the invention, fluid flow from the cooling system acts on the valve member to ensure that the valve directs the fluid to the cooling system until the flow from the cooling system is discontinued and the existing temperature is reduced.

The present invention provides the additional fluid storage space without the addition of more components. Presently, many systems utilize a cooler or radiator for the transmission fluid which is always filled with fluid such that it does not provide added storage as the fluid expands to the temperature increases.

DESCRIPTION OF THE PREFERRED EMBODIMENT

Figure 1:
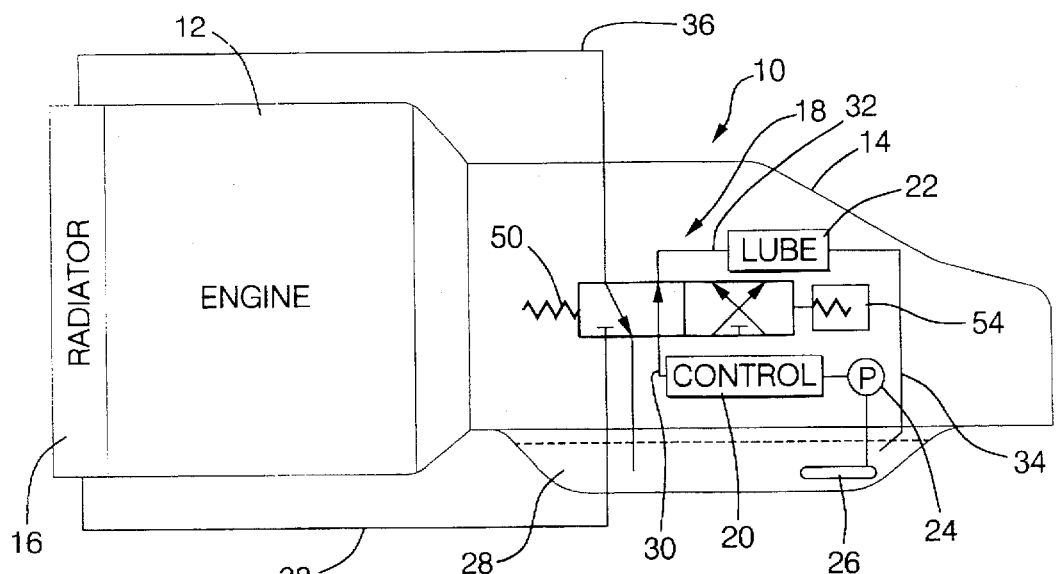
FIG. 1 is a diagrammatic representation of a powertrain incorporated in the present invention.

As seen in FIG. 1, a powertrain 10 incorporates an engine 12 and a transmission 14. The engine has associated therewith a radiator 16 through which the engine cooling fluid, such as antifreeze or glycol, is circulated to maintain in the engine at a desired operating temperature. The radiator has a conventional side or bottom pan which can be utilized for transmission cooling. However, with the present invention, the secondary radiator or side pan is not utilized one hundred percent of the time. When the operating system, especially the transmission, is cold, this secondary radiator is emptied.

The control of fluid to and from the secondary radiator is established by a thermally responsive control valve 18 which is in fluid communication with a conventional transmission control system 20, and a lube system or circuit 22. The control system 20 receives high pressure fluid from a pump 24 which draws fluid through a filter or screen 26 from a primary reservoir or sump 28. The fluid is delivered from the pump 24 to the control system 20 and then through a passage 30 to the valve 18.

In the condition shown in FIG. 1, the fluid from the valve 18 is delivered through a passage 32 to the lube circuit 22 from which the fluid is returned through a passage 34 to the reservoir 28. The valve 18 is also in fluid communication with the radiator 16 through an inlet or cooler feed passage 36 and an outlet or cooler return passage 38.

Figure 2:
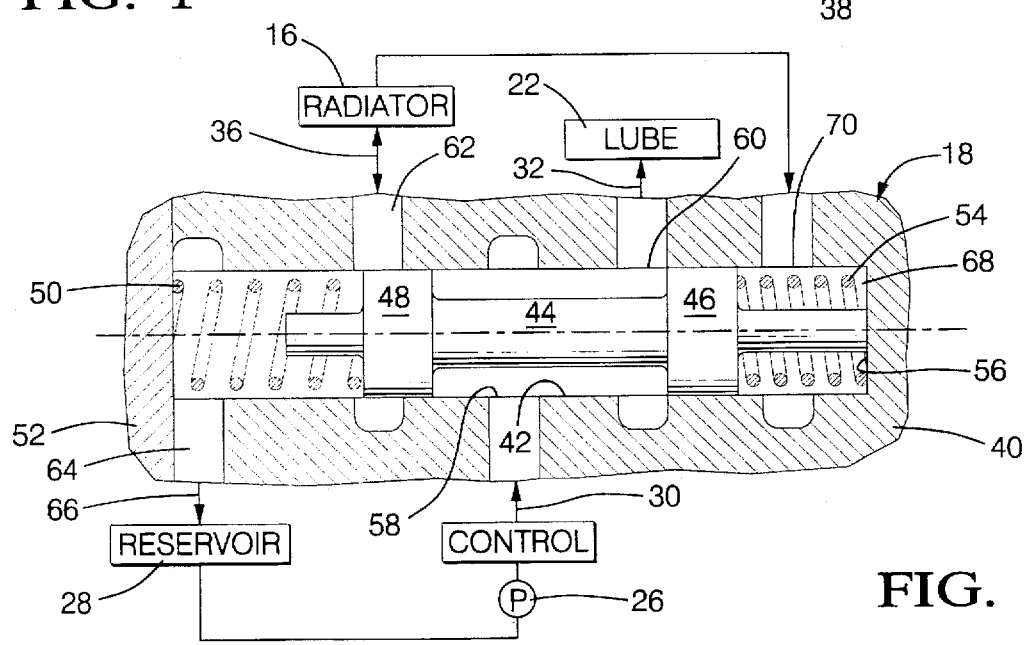
FIG. 2 is a diagrammatic representation of a hydraulic circuit with a valve member, wherein the valve is in a cold condition.
Figure 3:
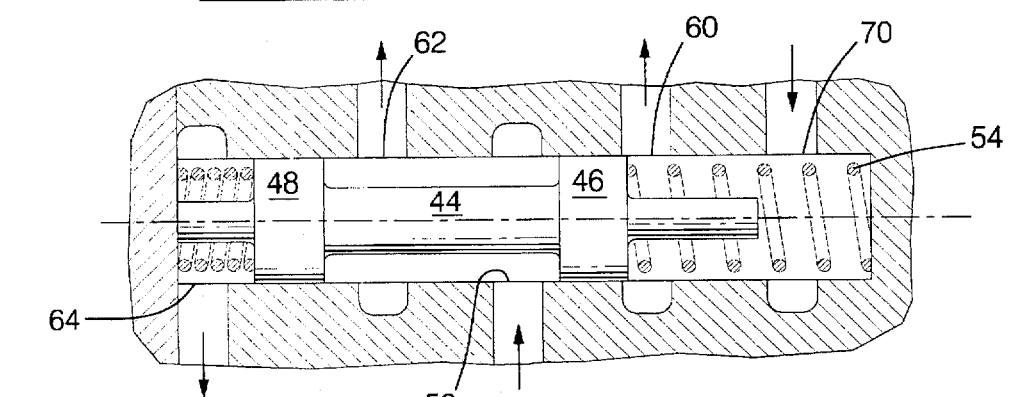
FIG. 3 is a diagrammatic view similar to FIG. 2 with the valve in a hot condition.

As best seen in FIGS. 2 and 3, the valve 18 includes a valve body 40 in which having a bore 42 in which is slidably disposed a spool valve 44. The spool valve 44 has spaced equal diameter lands 46 and 48. A conventional compression spring 50 is disposed between the valve land 48 and an end cap 52 which closes the bore 42. A temperature sensitive or thermally responsive spring 54 is disposed in compression between the valve land 46 and a bottom or end 56 of the bore 42.

The spring 50 has sufficient force stored therein to move the valve rightward against the spring 54, as shown in FIG. 2. This is the cold condition of the transmission. That is, the fluid temperature within the transmission is below the desired operating temperature. In this condition, the control 20 directs fluid through the passage 30 to a port 58 between the valve lands 46 and 48. The valve land 46 is positioned to open a port 60 which directs fluid through the passage 32 to the lube circuit 22. The valve land 48 controls fluid communication between a port 62 and a port 64. The port 64 is connected with the reservoir 28 through a passage 66.

The thermally responsive spring 54 is disposed in a chamber 68 which is in fluid communication with a port 70 connected with the outlet passage or return passage 38 from the radiator 16. The port 62 is connected to the inlet passage 36 to the radiator 16.

In the condition depicted in FIG. 2, the excess fluid from the control 20 is directed through ports 58 and 60 to the lube circuit 22 from which it is returned to the reservoir 28 after lubricating the various bearings and gears within the transmission.

As the transmission is operated under power, the fluid circulated therein rises in temperature and achieves the desired operating range. As the temperature of the fluid and the system itself increases in temperature, the spring 54 will begin to expand due to the added temperature thereof forcing the valve spool 44 to move toward the left, such that the valve land 46 will begin to close the port 60 while the valve land 48 begins opening the port 62. During this intermediate operating condition, fluid from the control 20 is directed both to the lube circuit 22 and to the radiator 16.

As the fluid is directed to the radiator 16, the fluid level in the reservoir 28 will begin to decrease. As this operation continues, the radiator 16 will become filled and begin returning fluid through the outlet passage 38 which is connected with the chamber 68. As the radiator 16 and chamber 68 are filled, the pressure within the chamber 68 will increase thereby adding to the force of spring 54, such that the valve 44 will be moved to the fully shifted position, as shown in FIG. 3.

In this condition, the port 58 is closed from the port 60 by the land 46 while the port 62 is fully opened to the passage 58 by the land 48. Also, the land 48 causes a discontinuance in communication between the port 62 and the port 64, while the valve land 46 creates a continuous communication between the port 70 and the port 60. In this condition, the fluid directed from the control 20 to the valve 18 is delivered to the radiator 16. The fluid in the radiator 16 is returned to the port 70 and then to the port 60 which, as previously described, is connected with the lube circuit 22. Thus, the fluid from the control 20 is cooled by the radiator 16 and is returned to effect lubrication of the transmission.

However, during this operating cycle, the radiator 16 remains full of transmission fluid, such that the level of the fluid in the primary reservoir 28 is maintained satisfactorily, such that rotating devices in the transmission, such as clutches and gears and brakes, not shown, will not dip into the fluid level, thereby creating a churning or foaming condition within the transmission. The level of fluid in reservoir 28 will remain sufficiently high, such that the filter 26 is never uncovered and open to ambient air, therefore preventing cavitation within the pump 24. Thus, added storage for fluid is attained without an increase in the number of components without a change in the axial length of the power transmission and with only the simple addition of the thermal responsive valve 18.

The valve 18 is shown to utilize a thermally responsive spring 54. However, a wax motor, which is commonly used as a thermostatic device can be utilized or, in more sophisticated applications, a thermally responsive solenoid mechanism can be incorporated within the valve 18 to control the displacement for the valve spool 44. These control devices for the valve spool 44 do not affect the overall operating cycle of the valve 18.

When the vehicle has come to rest and the transmission operation is discontinued, that is, the engine 12 is stopped, the oil temperature will at least retain the valve spool in a condition such that the port 62 is slightly open to the port 58. This condition will exist until the system temperature cools sufficiently such that the spring 54 is relaxed at which time the valve spool 44 will return to the condition shown in FIG. 2, and the fluid within the radiator will return to the main reservoir 28, thus emptying the transmission cooler in the radiator 16. This ensures that there is sufficient fluid in the reservoir 28 at start-up to completely cover the inlet screen or filter 26.

I claim:

1. Oil storage structure in a power transmission comprising:

a transmission housing;

a primary storage reservoir for continuously storing hydraulic fluid for use in the power transmission, said hydraulic fluid having a desired operating range including a first temperature and a second temperature;

a secondary storage reservoir comprising a cooling structure remote from said transmission housing for storing and cooling hydraulic transmission fluid when the temperature is at or above said second temperature; and a valve mechanism including a flow directing element, a thermally responsive spring, and a bias spring, said bias spring maintaining said flow directing element in a first position to prevent fluid flow to said secondary reservoir when said fluid is at or below said first temperature and simultaneously permit fluid in said secondary reservoir to return to said primary reservoir, said thermally responsive spring moving said flow directing element to a second position to direct fluid to said secondary reservoir and from said secondary reservoir to a lube circuit and prevent direct flow from said secondary reservoir to said primary reservoir.

2. The oil storage structure defined in claim 1 further comprising:

a pressure responsive area on said flow directing valve in fluid communication with said second storage reservoir and responsive to fluid pressure therein to assist said thermally responsive spring.

3. Oil storage structure in a power transmission comprising:

a transmission housing;

a primary storage reservoir formed within said transmission housing for continuously storing hydraulic fluid for use in the power transmission, said hydraulic fluid having a desired operating range including a first temperature and a second temperature;

a secondary storage reservoir comprising a cooling structure remote from said transmission housing for storing and cooling hydraulic transmission fluid when the temperature is at or above said second temperature; and a valve mechanism including a flow directing element, a thermally responsive spring, and a bias spring, said bias spring maintaining said flow directing element in a first position to prevent fluid flow to said secondary reservoir when said fluid is at or below said first temperature and simultaneously permit fluid in said secondary reservoir to return to said primary reservoir, said thermally responsive spring moving said flow directing element to a second position to direct fluid to said secondary reservoir and from said secondary reservoir to a lube circuit and prevent direct flow from said secondary reservoir to said primary reservoir.

\* \* \* \* \*